United States Patent Office 2,713,075
Patented July 12, 1955

2,713,075

METAL OXIDE TREATMENT OF OXO ALCOHOLS

Russell C. Doeringer, Mountainside, and Carl S. Carlson, Roselle, N. J., assignors to Esso Research and Engineering Company, a corporation of Delaware No Drawing. Application May 4, 1950,
Serial No. 160,088

9 Claims. (Cl. 260—643)

This invention relates to a solid-liquid treatment method for impure alcohols, particularly with respect to the purification of finished alcohol products with a view to the improvement of color qualities of both the alcohol and its chemical derivatives. Specifically, this invention is directed to a novel process for the purification of alcohol products obtained by the catalytic reaction of olefins with hydrogen and carbon monoxide to give reaction mixtures which consist substantially of carbonyl compounds which are subsequently hydrogenated in the presence of a sulfur-insensitive hydrogenation catalyst in order to convert the carbonyl groups substantially completely to alcoholic hydroxyl groups.

It has been discovered that impure alcohols such as those obtained from synthesis processes and especially the Oxo synthesis, can be purified as to color-producing impurities by treatment under specific conditions of temperature and time in a solid-liquid two phase system employing as the solid treating agents certain selected metallic oxides. Preferably, the treated alcohol is subjected to a subsequent distillation following the treatment in order to give a completely satisfactory alcohol product.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as acetals, hemiacetals, and esters. The carbonyl compounds which predominate in the product are then usually subjected to hydrogenation in a second stage to produce the corresponding alcohols, usually in a rather impure state.

Practically all types of organic compounds having an olefinic double bond may be used as starting materials to the first or oxonation stage including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable reaction conditions include temperatures of about 150°–450° F., pressures of about 100 to 300 atm., $H_2:CO$ ratios of about 0.5–4.0 to 1, liquid feed rates of about 0.5–5 v./v./hr. and gas feed rates of about 1,000–45,000 standard cu. ft. of $H_2+CO$ per barrel of liquid olefinic feed.

The hydrogenation stage may be operated at conventional hydrogenation conditions which include temperatures, pressures, gas and liquid feed rates approximately within the ranges specified above for the first stage. Various known types of hydrogenation catalysts including nickel, tungsten, molybdenum, their oxides and sulfides and others may be used. These catalysts may be supported on some suitable carrier such as charcoal. The liquid product from the hydrogenation stage is worked up by distillation to separate the desired alcohols from unconverted olefinic feed material, unhydrogenated carbonyl compounds, and hydrocarbons formed in the process.

The overall carbonylation or so-called "Oxo" reaction, as outlined above, provides a particularly effective method for preparing valuable primary alcohols, particularly of the $C_4$ to $C_{12}$ range. One of the largest and most important uses developed for the synthetic alcohol products is that of producing esters suitable for plasticizers, by reaction with both aliphatic and aromatic acids or anhydrides, including such examples as phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range, and particularly, the octanols and the nonanols.

Serious difficulties have been encountered in the hydrogenation stage as a result of sulfur poisoining of the hydrogenation catalyst, when the catalysts used are those such as nickel and others which are sulfur sensitive. The most readily available olefinic feed stocks for the oxygenation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and even completely destroy catalyst activity unless sulfur insensitive catalysts are used. The sulfur sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur insensitive catalysts include particularly certain metallic sulfide hydrogenating catalysts, examples of such catalysts being nickel sulfide, molybdenum sulfide and tungsten sulfide. While these catalysts have the decided advantage of avoiding the inactivation due to sulfur content of the feed stock, they also possess the disadvantage that they permit the sulfur to pass unchanged through the hydrogenation zone and, indeed, in many cases, tend to introduce additional sulfur contamination into the alcohol. Thus, the final crude alcohol may have a total sulfur content from 30 to 100 p. p. m. or in some cases, an even higher value if no sulfur clean-up operations are done.

In general, the entire content of the sulfur which is present in the synthetic Oxo alcohols is in the form of organically combined sulfur. Although the exact type of organic impurities in which the sulfur occurs has not been fully determined, it is believed that the sulfur is present in a variety of forms and that in general, it is deleterious in all these forms when occurring in the final alcohol, although certain types of organically combined sulfur are definitely known to be more undesirable than are other sulfur impurities. The more highly alkylated and less acidic sulfur materials appear to be less active in producing colored impurities in stainless steel and other types of metallic equipment. Furthermore, it has been found that in general the sulfur present in which the valence of the sulfur indicates it to be in a more highly oxidized form is less injurious than the sulfur which is present in a relatively reduced valence state. The finished alcohol should contain a minimum of sulfur-containing compounds and particularly those in which the sulfur is relatively more acidic and in a relatively more reduced state. It is also a better practice to remove a major portion of the carbonyl compounds in order to obtain alcohols which give commercially acceptable ester plasticizers. Some such purification is especially necessary if the ester is manufactured in stainless steel equipment and unreacted or excess alcohol is recycled to the esterification zone. A number of types of sulfur-containing impurities are believed to be present and among those probable in an isooctyl alcohol product prepared from a $C_7$ olefin, are isooctyl mercaptan, isooctyl sulfide, diethyl sulfide, diethyl disulfide, diisopropyl sulfide, diisopropyl disulfide, butyl sulfide, as well as the corresponding sulfinic acids, sulfonic acids, sulfoxides and sulfones.

Perhaps the most important commercial use for these higher molecular weight alcohols, such as the $C_8$ isooctyl alcohols produced by the Oxo reaction, is in esterification reactions to form compounds of the diester type for use as plasticizers in resin and plastic compositions. Those of the phthalate and adipate type are widely manufactured. Even though an alcohol product of a synthetic source appears to be colorless, it frequently contains small amounts of impurities which form colored bodies during the subsequent acid-alcohol reaction. These colored materials are difficult to remove from the resulting high-boiling ester products and result in inferior esters which require additional and excessive purification prior to their use as plasticizers.

These esters are prepared in standard type esterification equipment employing reactors made of stainless steel or other metal or, in some cases, in glass-lined reaction vessels.

In a number of instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. In fact, it has been found that, in order to obtain a high grade alcohol which adequately meets all specifications, the active, color-producing sulfur content should best be reduced to a value somewhere near 5 parts per million, although somewhat higher total sulfur concentrations can be tolerated, the exact limit of tolerance depending partially upon the form in which the sulfur occurs. Only certain types of the sulfur-containing impurities seem to be among the most active color formers.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials including sulfur containing impurities have the opportunity to build up during the recycle stages to a point at which they must be purged from the system before continuing the recycling operation. This presents impurity problems which occur even through the actual reaction is carried out in corrosion resistant or glass-lined equipment. The high temperature esterification is a much more severe test as to the purity and stability of the reactants and is more truly representative of typical plant scale esterification conditions.

There are regularly used a number of modified esterification procedures. Two of the main ones which are widely used for preparation of the dioctyl phthalate ester include the high temperature method in which the one mole of phthalic anhydride is heated with approximately 2 to 2.4 moles of octyl alcohol. The ester may be prepared in a number of ways. In one such method, the ester is recovered by distilling, first, the unreacted alcohol and anhydride under reduced pressure, then finally, if it is so desired, by distilling the ester. However, it is preferred to use the ester without distilling it, and this can be done if the alcohol used in the esterification is of sufficient purity. Although a number of finishing techniques are used, in all cases unreacted alcohol is distilled off for recycle. The catalytic method in which benzene sulfonic acid or a similar type material is used as a catalyst may be employed to give catalytic esterification at a lower temperature. The color degradation of isooctyl alcohol during esterification has also been found to be a function of time and completeness of esterification. The highly purified isooctyl alcohol products, such as those made from alcohol purified through the borate ester or prepared over a sulfur-sensitive metallic hydrogenation catalyst, show practically no color degradation in any method of esterification. Such refined methods of production are, however, prohibitively expensive for large scale commercial production. The ester color can be expressed in terms of a Hazen ester color number, a high number indicating a darkened, low quality ester product. An alcohol having a Hazen ester color of 75 to 100 is considered acceptable for commercial use. This standard test for ester color is described in the literature and is reported in A. S. T. M. D-268-46.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic strips, the standard esterifications being done in glass type reactors. The strips preferably used and those which give the most reproducible results are of the type 304 stainless steel, the surface of which has been prepared by sand blasting. Powdered stainless steel can also be employed in the esterification reactions to test the purity of the Oxo alcohol, particularly as to sulfur content. This test is considered to be the most rigorous and gives the most complete test of alcohol quality when the impurities being tested for are of the sulfur type.

It has now been discovered that undesirable color characteristics of primary alcohols prepared by the Oxo reaction and containing impurities, particularly those of the sulfur containing and color forming type, can be essentially eliminated and a good grade of synthetic alcohol produced. This novel method of treatment is carried out by contacting the liquid alcohol, preferably subsequent to at least one distillation in which lighter products are removed with a solid treating agent consisting essentially of certain selected metallic oxides. It has been discovered by actual experiment that only a restricted number of metallic oxides are able to produce the beneficial effect of removing the color producing impurities, particularly the undesirable sulfur compounds. The beneficial results generally are manifested by a striking reduction in the over-all sulfur content of the treated alcohol and also by the color of the esters such as the phthalate ester produced in esterification reactions using the thus treated alcohol. Color developed during esterification is measured in a number of ways, including a phthalate ester color value and a measure of the color adsorption at a standard wave length value. Preferably, the treatment with metallic oxides is followed by a redistillation in which the alcohol is recovered substantially completely with only minor amounts of material being discarded at the beginning and the end of the rerunning operation.

The types of metallic oxides particularly preferred for treating sulfur-containing alcohols and particularly those produced in an Oxo reaction include mercury oxide, manganese dioxide, and lead oxide, particularly red lead oxide. In general, these oxides are the only metallic oxides found to give the highly desirable results necessary for the required purification. However, a number of related materials were found to give some improvement in alcohol quality. These materials include cadmium oxide, silver oxide, chromium oxide, copper oxide, barium oxide, and magnesium oxide. Certain metallic oxides, have, however, been found to give substantially no improvement and in fact may even show detrimental effects on the quality of the alcohol as reflected in the color and odor of the alcohol itself or of organic esters prepared therefrom. Metal oxides generally to be found in this class include tin oxide, aluminum oxide, titanium dioxide, silica, and calcium oxide. Although it is not desired to limit this invention to any particular chemical theory to explain the extremely surprising results obtained from the specific oxides, it is believed that it is at least necessary to use a metal oxide in which the metallic ion is capable of at least two valence values and in which the metallic ion is initially in a relatively high state of oxidation such that it may serve as an oxidizing agent during the treatment of the sulfur-containing impure alcohol, thereby causing the metal of the metal oxide to assume a lower or reduced valence.

In general, the treatment reaction is carried out by contacting the liquid alcohol with the solid metallic oxide under conditions which assure adequate contacting of the impure alcohol with the treating agent as any commonly used method for achieving such contact of liquids and solids may be employed to carry out the treating, intimate mixing of the two phases being a necessary feature of the mechanical operation. In certain cases, it may be possible to use the solid treating agent as a bed, in which case an inert support may be necessary upon which the treating agent is suspended.

Another manner in which the contacting may be advantageously carried out is by the use of a fine dispersion of the solid metallic oxide in the liquid alcohol.

In some cases, additional benefit is obtained by the simultaneous use of air in conjunction with the metallic oxide treatment. Although it has been found that where no benefit is obtained from a metallic oxide, air will not affect the results. In some cases, metallic oxides which alone give only mediocre effects, in the presence of air show surprisingly good results. This is particularly true in the case of manganese dioxide. No unusual results were obtained upon the addition of air when using mercury oxide and lead oxide as the treating agents.

Although no critical limits of pH values were found to affect the treatment from purity considerations and chemical nature of the alcohol itself, it is considered best practice to carry out the contacting of the metallic oxide with the impure alcohol under conditions which are either substantially neutral, that is, at a pH of approximately 7 or possibly slightly on the alkaline side. Acidic conditions are generally to be avoided.

Although there is no critical feature as to the best temperature to be employed, in general it is advisable to use a treating temperature as low as possible and yet accomplish the desired purification results. For the more active treating agents, room temperature has been found to be adequate, provided the time of exposure of the alcohol to the treating agent is adequate. In case air or an oxygen-containing gas is employed with the treating agent, optimum temperatures may be varied. Generally speaking, the higher the temperature, the shorter the contacting time which is required to accomplish comparable results. Treating temperatures of from about 25° C. up to 180° C. have been employed with satisfactory results. The lower the temperature which can be used, the less danger there is of destroying a part of the alcohol itself during the treatment. Treating times should be controlled in order to balance the results against efficiency of operation. Treating times of from one to two hours have generally been found sufficient to give an acceptable quality of alcohol.

With regard to the proportions of treating agent used in contacting the alcohol, variations will be found, depending upon the exact source of the alcohol, the treating agent being used, the optional use of air or other oxygen-containing gas, the temperature, and the exact proportion and composition of the sulfur-containing impurities which it is desired to remove. It has been found that the use of about 10% to 50% by weight of the solid contacting agent based upon the total amount of alcohol being treated will in most cases be adequate.

Although it is possible to use the crude alcohol prior to a topping operation, this practice is generally considered to be undesirable. Thus, it is much better to employ as a feed to the treating process a topped Oxo alcohol, that is, one from which lower boiling materials have been substantially removed and in fact, it is preferred to treat only a finished or distilled alcohol, that is, an alcohol product which has been subjected to distillation.

It has further been found that following the treatment, the alcohol will require a further distillation in order to obtain a product of the most desirable quality for the production of color-free esters. In general, a conventional type distillation using an ordinary fractionating column will be sufficient for distilling the alcohol following the treatment. It is to be further noted that in some cases in which the metal oxide may show appreciable solubility in the alcohol or in the impurities therein, a washing operation may be required in order to remove the dissolved or suspended solid from the alcohol prior to a redistillation step.

It is a further advantage of this invention that the alcohol which is used as the starting feed is recovered in high purity with a substantially reduced content of sulfur and, particularly, with a reduction in the color-forming impurities of the alcohol. As a further advantage, the recovery of useful alcohol is practically quantitative following the treatment, since the metallic oxides preferred for the treating operation show negligent absorbency for the alcohol and are also relatively insoluble in the alcohol product, thus minimizing any losses which might otherwise occur by such treatment.

The invention will be better understood in conjunction with the detailed examples given below.

*Example I*

An isooctyl alcohol prepared by the oxonation of a $C_7$ hydrocarbon stream using carbon monoxide and hydrogen and followed by catalytic hydrogenation of the aldehyde product to give a mixture predominantly $C_8$ primary alcohols but containing difficultly removable impurities of the sulfur-containing class was treated with $Pb_3O_4$. The alcohol was treated by contacting 200 grams in a reaction vessel with 40 grams of the red lead oxide while maintaining constant agitation with a mechanical stirring apparatus. The solution was maintained at approximately 80° C. for approximately 2 hours, the total time of the treatment and the solution was simultaneously contacted with an excess of air (47 liters). The alcohol solution was then cooled, filtered, water washed, rerun, and subjected to a two-hour esterification with phthalic anhydride in the presence of a sand blasted type 304 stainless steel strip. The phthalate ester color of the product was 225 and the light adsorption value at 4,470 Å. was 0.060 as compared to the untreated alcohol which gave an ester color value of about 12,000 and an equivalent light adsorption of more than 2.00. The sulfur content of the untreated alcohol was 41 p. p. m. which was reduced by the lead oxide treatment to 29 p. p. m.

*Example II*

In a similar experiment using $Pb_3O_4$ for the treatment of an impure sulfur containing isooctyl alcohol in which the impurities caused color formation during the preparation of derivatives, was treated with $Pb_3O_4$ for one hour at room temperature in a manner similar to the treatment process described in Example I. The alcohol was filtered, water washed, and rerun. A phthalate ester prepared under standard conditions in the presence of type 304 sand blasted stainless steel strip was found to have an ester color value of about 600 and a light adsorption at 4,470 Å. of 0.140.

*Example III*

An impure isooctyl alcohol containing sulfur impurities and prepared by the Oxo reaction was treated with solid PbO and air for two hours at a temperature of approximately 80° C. Constant agitation was maintained throughout the treatment to insure good contacting of the alcohol with the solid lead oxide. The alcohol was subsequently filtered, water washed, and rerun. When subjected to an esterification reaction with phthalic anhydride in the presence of a sand blasted type 304 stainless steel strip, the ester color was found to be 85 as compared with a value of 800 for the untreated alcohol.

*Example IV*

A topped isooctyl alcohol containing about 82 p. p. m. of sulfur was found to show an ester color value of about 12,000 and a light adsorbency at the standard wave length of 4,470 Å, of more than 2.0. When 200 grams of this alcohol were subjected to treatment with 80 grams of HgO at 150° C. for two hours, 60 liters of air was passed through the alcohol during the two-hour period of treatment. Following the treatment, the alcohol was filtered, water washed, and subjected to redistillation. When the thus treated alcohol was used to esterify phthalic anhydride, the resulting ester product was found to show an ester color of about 560 and a light adsorption of only 0.100. The alcohol itself was found to have only 4 p. p. m. of sulfur, an outstanding improvement in the sulfur content as compared with 82 p. p. m. of sulfur in the untreated alcohol.

*Example V*

When HgO was used as a treating agent at approximately room temperature for one hour, employing 80 grams of solid treating agent per 200 grams of alcohol, the phthalate ester color of the ester prepared from the treated alcohol in the presence of sand blasted type 304 stainless steel was found to be about 490 and the light adsorption was 0.115.

*Example VI*

When an impure isooctyl alcohol from which the lower boiling materials had been removed was contacted with $MnO_2$ and an excess of air at a temperature of about 100° C. to 180° C. for two hours, the treated and redistilled alcohol was found to contain about 24 p. p. m. of sulfur as compared with about 83 p. p. m. of sulfur in the untreated alcohol and the ester color of the ester prepared therefrom in the presence of sand blasted type 304 stainless steel was found to be about 185 as compared with an ester color of 1000+ given by the untreated alcohol.

*Example VII*

When an experiment was carried out in every way similar to that described in Example VI except that lower temperatures of the order of 70° C. to 80° C. were maintained during the treatment with the manganese dioxide plus air, the ester color given by the ester prepared from the treated alcohol in the presence of sand blasted type 304 stainless steel was found to be about 600.

What is claimed is:

1. A process for the treatment of a water-immiscible, primary, $C_4$–$C_{12}$ alcohol containing sulfur impurities which was produced in a two-stage operation consisting of a first stage in which hydrogen, carbon monoxide, and an olefin are contacted in the presence of an oxonation catalyst, forming a product predominantly aldehyde and of a second stage in which the said aldehyde product is catalytically reduced with hydrogen to form the corresponding alcohol and from which components more volatile than the alcohol have been removed, which comprises the liquid-solid contacting of the topped alcohol with a solid metallic oxide selected from the group consisting of mercury oxide, manganese dioxide, and lead oxide, at temperatures of from 25°–180° C., whereby undesirable impurities, particularly those of the sulfur-containing class are rendered substantially harmless particularly as to color-producing tendencies in subsequent reactions of the alcohol.

2. A process such as that described in claim 1 in which the treated alcohol is subjected to a distillation following the metallic oxide treatment.

3. A process for the treatment of a water-immiscible, primary $C_8$ alcohol containing sulfur impurities prepared by the Oxo process wherein carbon compounds containing olefinic linkages are contacted with carbon monoxide and hydrogen to form an aldehyde product, and said aldehyde product is subsequently hydrogenated and from which substantially all components more volatile than the alcohol have been removed, which comprises the liquid-solid contacting of the topped alcohol with a solid metallic oxide selected from the group consisting of mercury oxide, manganese dioxide, and lead oxide at temperatures of from 25°–180° C. for a period of time of from one to two hours, whereby undesirable impurities particularly those of the sulfur-containing class are rendered substantially harmless as color-producing bodies in subsequent reactions of the alcohol and the total sulfur content of the topped alcohol is substantially reduced by the treatment.

4. A process such as that described in claim 3 in which the treated alcohol is subjected to at least one distillation following the metallic oxide treatment.

5. A process for the treatment of a Oxo water-immiscible, primary alcohol containing sulfur impurities having from four to twelve carbon atoms which was produced in a two-stage operation consisting of a first stage in which hydrogen, carbon monoxide, and an olefin are contacted in the presence of an oxonation catalyst forming a product predominantly aldehyde and of a second stage in which the aldehyde product is catalytically reduced with hydrogen to form the corresponding alcohol, and from which components more volatile than the alcohol have been removed, which comprises the liquid-solid contacting of the topped alcohol with a solid metallic oxide selected from the group consisting of mercury oxide, manganese dioxide, and lead oxide for a period of time sufficient so that undesirable impurities particularly those of the sulfur-containing class are rendered substantially harmless as color-producing bodies in subsequent reaction to the alcohol.

6. A process such as that described in claim 5 in which the alcohol being purified is a $C_8$ alcohol.

7. A process such as that described in claim 5 in which the topped alcohol being purified is a $C_8$ alcohol and the metallic oxide used as a treating agent is mercury oxide.

8. A process such as that described in claim 5 in which the topped alcohol being purified is a $C_8$ alcohol and the metallic oxide used as a treating agent is manganese dioxide, and the alcohol is contacted with air during the metallic oxide treatment.

9. A process such as that described in claim 5 in which the topped alcohol being purified is a $C_8$ alcohol and the metallic oxide used in the treatment is red lead oxide.

References Cited in the file of this patent

UNITED STATES PATENTS

| | | |
|---|---|---|
| 685,907 | Colin | Nov. 5, 1901 |
| 1,581,369 | Weir | Apr. 20, 1926 |
| 2,068,872 | Rosen et al. | Jan. 26, 1937 |
| 2,099,475 | Giesen et al. | Nov. 16, 1937 |
| 2,221,183 | Dolbear | Nov. 12, 1940 |
| 2,320,939 | Leum | June 1, 1943 |
| 2,525,354 | Hoog et al. | Oct. 10, 1950 |
| 2,585,816 | Mertzweiller | Feb. 18, 1952 |
| 2,626,284 | Smith | Jan. 20, 1953 |